United States Patent
Gosse et al.

(10) Patent No.: US 10,736,276 B2
(45) Date of Patent: Aug. 11, 2020

(54) COLLOIDAL BARRIER MATERIALS AND METHODS OF MAKING AND USING THE SAME

(71) Applicant: Agricultural Utilization Research Institute (AURI), Crookston, MN (US)

(72) Inventors: Jimmy L. Gosse, Crookston, MN (US); Ranae Jorgenson, Marshall, MN (US); Douglas Root, Roseville, MN (US); Michael W. Stutelberg, Canby, MN (US)

(73) Assignee: Agricultural Utilization Research Institute, Crookston, MN (US)

( * ) Notice: Subject to any disclaimer, the term of this patent is extended or adjusted under 35 U.S.C. 154(b) by 0 days.

(21) Appl. No.: 16/508,424

(22) Filed: Jul. 11, 2019

(65) Prior Publication Data
US 2020/0015432 A1 Jan. 16, 2020

Related U.S. Application Data (60) Provisional application No. 62/697,120, filed on Jul. 12, 2018.

(51) Int. Cl.
*A01G 13/02* (2006.01)
*B01F 3/08* (2006.01)

(52) U.S. Cl.
CPC ........ *A01G 13/0256* (2013.01); *B01F 3/0807* (2013.01); *B01F 2003/0842* (2013.01); *B01F 2003/0884* (2013.01)

(58) Field of Classification Search
CPC ... C09D 5/00; C09D 5/26; C09K 5/06; C09K 17/00–52; A01G 13/0256;
(Continued)

(56) References Cited

U.S. PATENT DOCUMENTS

| 4,238,536 A | 12/1980 | Koch et al. |
| 6,033,651 A * | 3/2000 | Dolak ................... A61K 8/042 |
| | | 424/400 |

(Continued)

FOREIGN PATENT DOCUMENTS

| FR | 2911756 A1 * | 8/2008 | ............. A01N 25/04 |
| WO | WO-2004095924 A1 * | 11/2004 | ........... C05G 3/0047 |
| WO | 2016058096 A1 | 4/2016 | |

OTHER PUBLICATIONS

Whistler, R. L.; BeMiller, J. N. Industrial Gums: Polysaccharides and Their Derivatives. Academic Press, Inc. 1973. pp. 29-48. (Year: 1973).*

(Continued)

*Primary Examiner* — Stephen E Rieth
(74) *Attorney, Agent, or Firm* — O'Connor & Company; Ryan P. O'Connor (57) ABSTRACT

Some variations provide an emulsion-colloid system for forming a colloidal barrier material disposed on a substrate, the system comprising a hydrophilic first liquid, an acid, a gelling agent, a hydrophobic second liquid, a plasticizer, and optionally additives, wherein the emulsion-colloid system is characterized by (1) a first instance that is a flowable emulsion above 60° C. and less than the boiling point of the first liquid, and (2) a second instance that is a colloid below 40° C. The emulsion-colloid system is capable of reversible transition, mediated by temperature, between the first instance and the second instance. The disclosed colloidal barrier material provides the functionality of plastic alternatives while removing disadvantages. The disclosed colloidal barrier material reduces labor-intensive application of the barrier, such as the case for covering grain piles with (Continued)

plastic tarps. The disclosed colloidal barrier material also eliminates the need for removal when barrier protection is no longer required.

18 Claims, 4 Drawing Sheets

(58) Field of Classification Search
CPC .............. A01G 2013/004; A01G 13/02; B01F 3/0807–088; B01F 2003/0823–0896; C08J 2205/02–028; A01N 25/04; E02D 3/12
USPC .................................................. 516/902, 903
See application file for complete search history.

(56) References Cited

U.S. PATENT DOCUMENTS

| | | |
|---|---|---|
| 7,854,994 B2 | 12/2010 | Henderson-Rutgers et al. |
| 8,636,993 B2 | 1/2014 | Scholz et al. |
| 9,089,823 B2* | 7/2015 | Trudsoe .................. A23L 29/30 |
| 2005/0208196 A1* | 9/2005 | Charoenwongse .. A23D 7/0053 426/602 |
| 2009/0220576 A1* | 9/2009 | Haug .................... A23L 33/115 424/439 |

OTHER PUBLICATIONS

Nijenhuis, K.; Thermoreversible networks: Viscoelastic Properties and Structure of Gels. Springer-Verlag Berlin Heidelberg. 1997. pp. 1-12 and 160-235. (Year: 1997).*

Machine Translation of FR2911756 A1. Aug. 1, 2008. (Year: 2008).*

International Search Report and Written Opinion, PCT/US2019/041510, dated Sep. 30, 2019.

Morrison, "Brainstorming a Better Tarp", AG Innovation News, vol. 20, No. 3, Jul.-Sep. 2011.

* cited by examiner

COLLOIDAL BARRIER MATERIALS AND METHODS OF MAKING AND USING THE SAME

PRIORITY DATA

This patent application is a non-provisional application claiming priority to U.S. Provisional Patent App. No. 62/697,120, filed on Jul. 12, 2018, which is hereby incorporated by reference herein.

FIELD OF THE INVENTION

The present invention generally relates to the process and methods of producing an emulsion-colloid system disposed as a colloidal barrier. The colloidal barrier is disposed on biomass, grains, soils and other materials. Agricultural applications for the colloidal barrier include as an alternative for plastic mulch films in fruit and vegetable production and as an alternative to plastic tarps used in grain storage.

BACKGROUND OF THE INVENTION

The use of plastic covers, barriers, films and tarps in agriculture is common practice. Generally low cost and ease of use are among the many advantages. Significant disadvantages also exist including persistent environmental pollution from plastic that escapes proper handling processes, intentional improper disposal and in some applications the risk to laborers handling the materials. One product example is the use of plastic mulch film which is used as a common agricultural practice in the production of many fruits and vegetables including cucumbers, squash, melons, peppers, tomatoes and okra. Some of the advantages for using plastic mulch are cleaner product, better water management, reduction in some pests, and earlier and higher overall yields. Significant disadvantages including increased soil degradation from intensive cropping, increased source material for distributed terrestrial microplastics, labor intensive and expensive disposal associated with proper handling of the material.

Another example is the use of plastic tarps in covering of grain piles. These plastic tarps protect the stored grain from losses prior to going to market and or final use. The proper installing and removal of these tarps can be hazardous to employees, disposal is relatively expensive, and the material can be a source of plastic pollution.

There is a need for plastic covers, barriers, films, tarps and similar barrier materials that are not composed of petroleum-derived plastic polymers. Alternatives are needed which provide some or all the functionality of plastic alternatives while removing some or all of the disadvantages.

Barrier materials are also needed which reduce or eliminate labor-intensive application of the barrier, such as the case for covering grain piles with plastic tarps or similar plastic materials. Barrier materials are also needed which reduce or eliminate the need for removal when barrier protection is no longer required, or when the underlying material is accessed such as the case for agricultural plastic mulch materials which must be removed prior to tilling and for grain tarps which are removed prior to transporting the grain.

SUMMARY OF THE INVENTION

The present invention addresses the aforementioned needs in the art, as will now be summarized and then further described in detail below.

Some variations provide an emulsion-colloid system for forming a colloidal barrier material disposed on a substrate, the emulsion-colloid system comprising:

5 wt % to 25 wt % of a hydrophilic first liquid;
0.01 wt % to 5 wt % an acid;
1 wt % to 21 wt % a gelling agent;
5 wt % to 25 wt % of a hydrophobic second liquid;
1 wt % to 50 wt % of a plasticizer; and
optionally 0.01 wt % to 50 wt % of one or more additives,
wherein the emulsion-colloid system is characterized by a first instance that is a flowable emulsion above 60° C. and less than the boiling point of the first liquid, wherein the emulsion-colloid system is characterized by a second instance that is a colloid below 40° C., and wherein the emulsion-colloid system is capable of reversible transition, mediated by temperature, between the first instance and the second instance.

In some embodiments, the hydrophilic first liquid is water, wherein the water is preferably selected from the group consisting of well water, purified water, reverse osmosis water, process water, municipal water, soft water, hard water, tap water, and combinations thereof.

In some embodiments, the acid is selected from the group consisting of mineral acids, organic acids, carboxylic acids, and combinations thereof.

In some embodiments, the gelling agent is selected from the group consisting of agar, agarose, alginate, gelatin, carrageenan, carboxymethyl cellulose, guar gum, sodium pectate, gum tragacanth, and combinations thereof.

In some embodiments, the hydrophobic second liquid is selected from the group consisting of petroleum-based oil, plant-based oil, animal based-oil, and combinations thereof.

In some embodiments, the plasticizer comprises glycerin derived from a petroleum source, a plant source, an animal source, or combinations thereof.

In some embodiments, the additives are selected from the group consisting of crosslinking agents, photoreactive polymers, gas-impermeability agents, UV-absorption agents, light-scattering agents, catalyst deactivators, chemical-absorption agents, fertilizers, herbicides, pesticides, insecticides, fungicides, stabilizers, nanoparticles, fire retardants, emulsifiers, waxes, viscosity modifiers, colorants and combinations thereof.

When the emulsion-colloid system is in the form of the second instance, the second instance may be a colloidal barrier material disposed on a substrate. The colloidal barrier material is preferably a contiguous layer that is physically integral with the substrate surface.

The substrate may be selected from the group consisting of grain, soil, silage, plants, plant roots, and lignocellulosic biomass. Combinations are also possible, e.g. soil and plants together. Other substrates are also possible.

Some variations provide an emulsion-colloid system for forming a colloidal barrier material disposed on a substrate, the emulsion-colloid system comprising:

5 wt % to 25 wt % of a hydrophilic first liquid;
0.01 wt % to 5 wt % an acid;
1 wt % to 21 wt % a gelling agent;
5 wt % to 25 wt % of a hydrophobic second liquid;
15 wt % to 40 wt % of a wax;
1 wt % to 45 wt % of a plasticizer;
0.01 wt % to 4 wt % of an emulsifier; and
optionally 0.01 wt % to 15 wt % of one or more additives,
wherein the emulsion-colloid system is characterized by a first instance that is a flowable emulsion above 60° C. and less than the boiling point of the first liquid, wherein the emulsion-colloid system is characterized by a second instance that is a colloid below 40° C., and wherein the emulsion-colloid system is capable of reversible transition, mediated by temperature, between the first instance and the second instance.

In some embodiments, the hydrophilic first liquid is water, wherein the water is preferably selected from the group consisting of well water, purified water, reverse osmosis water, process water, municipal water, soft water, hard water, tap water, and combinations thereof.

In some embodiments, the acid is selected from the group consisting of mineral acids, organic acids, carboxylic acids, and combinations thereof.

In some embodiments, the gelling agent is selected from the group consisting of agar, agarose, alginate, gelatin, carrageenan, carboxymethyl cellulose, guar gum, sodium pectate, gum tragacanth, and combinations thereof.

In some embodiments, the hydrophobic second liquid is selected from the group consisting of petroleum-based oil, plant-based oil, animal based-oil, and combinations thereof.

In some embodiments, the wax is selected from the group consisting of plant-derived wax, animal-derived wax, petroleum-derived wax, and combinations thereof.

In some embodiments, the plasticizer comprises glycerin derived from a petroleum source, a plant source, an animal source, or combinations thereof.

In some embodiments, the additives are selected from the group consisting of crosslinking agents, photoreactive polymers, gas-impermeability agents, UV-absorption agents, light-scattering agents, catalyst deactivators, chemical-absorption agents, fertilizers, herbicides, pesticides, insecticides, fungicides, stabilizers, nanoparticles, fire retardants, viscosity modifiers and combinations thereof.

In some embodiments, the emulsion-colloid system is in the form of the second instance, and wherein the second instance is a colloidal barrier material disposed on a substrate.

In some embodiments, the colloidal barrier material is a contiguous layer that is physically integral with the substrate surface.

The substrate may be selected from the group consisting of grain, soil, silage, plants, plant roots, and lignocellulosic biomass. Combinations are also possible, e.g. soil and plants together. Other substrates are also possible.

Certain embodiments provide an emulsion-colloid system for forming a colloidal barrier material disposed on a substrate, the emulsion-colloid system comprising:

5 wt % to 25 wt % water;
0.01 wt % to 5 wt % citric acid;
5 wt % to 10 wt % gelatin;
10 wt % to 45 wt % glycerin;
0.01 wt % to 5 wt % guar gum;
0.01 wt % to 5 wt % mustard powder;
5 wt % to 25 wt % soybean oil;
15 wt % to 40 wt % stearine;
0.01 wt % to 2 wt % titanium dioxide; and
0.01 wt % to 5 wt % colorant, dye, pigment, or other coloring agent, wherein the emulsion-colloid system is characterized by a first instance that is a flowable emulsion above 60° C. and less than 100° C., wherein the emulsion-colloid system is characterized by a second instance that is a colloid below 40° C., and wherein the emulsion-colloid system is capable of reversible transition, mediated by temperature, between the first instance and the second instance.

DETAILED DESCRIPTION OF EMBODIMENTS OF THE INVENTION

The compositions, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique. Concentrations may be intermediate to any recited values in a list of concentrations for a particular component.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus, in some embodiments not otherwise explicitly recited, any instance of "comprising" may be replaced by "consisting of" or, alternatively, by "consisting essentially of."

With respect to the term "emulsion" used herein, in reference to the disclosed and claimed subject matter is defined as a fine dispersion of one liquid in another in which the liquid is not soluble or miscible. The emulsion may be a thermodynamic emulsion or a kinetically stable emulsion. That is, in some cases, a kinetically stable emulsion is not predicted at equilibrium but may still be formed and not settle for a time period effective for processing.

The term "colloid" used herein, in reference to the disclosed and claimed subject matter is defined as the emulsion cooled to a temperature in which it is solidified. The solidification of the colloid may occur in part or in whole by one or more mechanisms related to the temperature mediated thermal transition of the emulsion from liquid to solid such as gelation, setting, crosslinking, solidification, freezing, and/or crystallization. The solidified emulsion as a colloid is described as "solid" which, as used herein, in reference to the disclosed and claimed subject matter is similar to other colloids which may be considered amorphous solids such as gelatin, butter, cheese and agar.

The "emulsion-colloid system" used herein, in reference to the disclosed and claimed subject matter is defined as a composition having a plurality of instances (states) capable of reversible transition mediated by temperature from the emulsion to the colloid, and later from the colloid back to the emulsion. An "instance" is a state of the system, at a point in time. A system instance in the form of an emulsion will be measurably different than a system instance of the same composition in the form of a colloid. Measurable differences include viscosity (higher for colloid versus emulsion) and potentially density, settling time, light scattering, and membrane diffusivity, for example.

The emulsion-colloid system can be exemplified in one non-limiting way as the first, initial instance (formation) of the emulsion followed by a first instance of the colloid then heating to a second instance of the emulsion followed by cooling to a second instance of the colloid followed by heating to a third instance of the emulsion followed by cooling to a final instance of the colloid as a colloidal barrier material. Typically, when there are i instances of the colloid in a given embodiment, instances 1, 2, . . . , i−1 are not disposed on a substrate while instance i is disposed on the ultimate substrate (e.g., corn). Colloid instances <i may be in contact with a different sort of surface, such as a container wall or a platform for transport, but these surfaces are not substrates intended to be barriered.

The emulsion-colloid system may also be characterized by a first instance (system state) that is a flowable emulsion above 60° C. and a second instance that is a colloid below 40° C. In this sense, the instances are referring to states of the system in time. When temperature is used to mediate a reversible transition between emulsion and colloid, the emulsion-colloid system may later be characterized by a third instance that is a flowable emulsion above 60° C., a fourth instance that is a colloid below 40° C., and potentially further instances that are either a flowable emulsion above 60° C. or a colloid below 40° C.

The emulsion-colloid system is preferably characterized by reversibility of the system mediated by raising and lowering temperature which enables multiple instances of the emulsion and colloid. The system is not limited to a definite number of instances with instances ranging from one to three or more than three. The emulsion-colloid system may display a hysteresis in its melting and solidification temperature. The solidification of the colloid may occur in part or in whole by one or more mechanisms and there can be a region that is a colloid and a region that is still an emulsion such as when an instance of a colloid is forming in a non-uniform way or an instance of the emulsion is forming in a non-uniform way.

The melting temperature of the emulsion-colloid system may vary, such as one or more temperatures selected from about 30° C. to about 70° C., e.g. about 35° C., 40° C., 45° C., 50° C., 55° C., 60° C., or 65° C. As is known, a given composition can sometimes be characterized by multiple melting temperatures associated with different components or combinations of components. The solidification temperature of the emulsion-colloid system may vary, such as one or more temperatures selected from about 30° C. to about 70° C., e.g. about 35° C., 40° C., 45° C., 50° C., 55° C., 60° C., or 65° C. Ranges of temperature for melting and solidification are possible, and hysteresis is possible. To illustrate, in a certain embodiment, the emulsion-colloid system when initially in the emulsion state solidifies over a temperature range of 35-40° C.; once in the colloid state, the colloid has a melting range of 60-65° C. to revert to the emulsion state, for example.

The viscosity of the emulsion-colloid system, in the colloid state, is higher than the viscosity of the system in the emulsion state. The viscosity of the emulsion, measured at 60° C., may be from about 0.001 Pa·s to about 100 Pa·s, such as about, or at most about, 0.005 Pa·s, 0.01 Pa·s, 0.1 Pa·s, 1 Pa·s, 10 Pa·s, or 50 Pa·s. The viscosity of the emulsion at 60° C., 70° C., 80° C., 90° C., or 99° C. is sufficiently low such that the emulsion can flow for application onto a substrate. The viscosity of the colloid, measured at 40° C., may be from about $10^2$ Pa·s to about $10^5$ Pa·s, such as about, or at least about, $10^2$ Pa·s, $10^3$ Pa·s, $10^4$ Pa·s, or $10^5$ Pa·s. The viscosity of the colloid at 40° C., 30° C., 20° C., 10° C., or 0° C. is sufficiently high such that the colloid does not appreciably flow and cease to be an effective barrier to the substrate.

Figure 3:
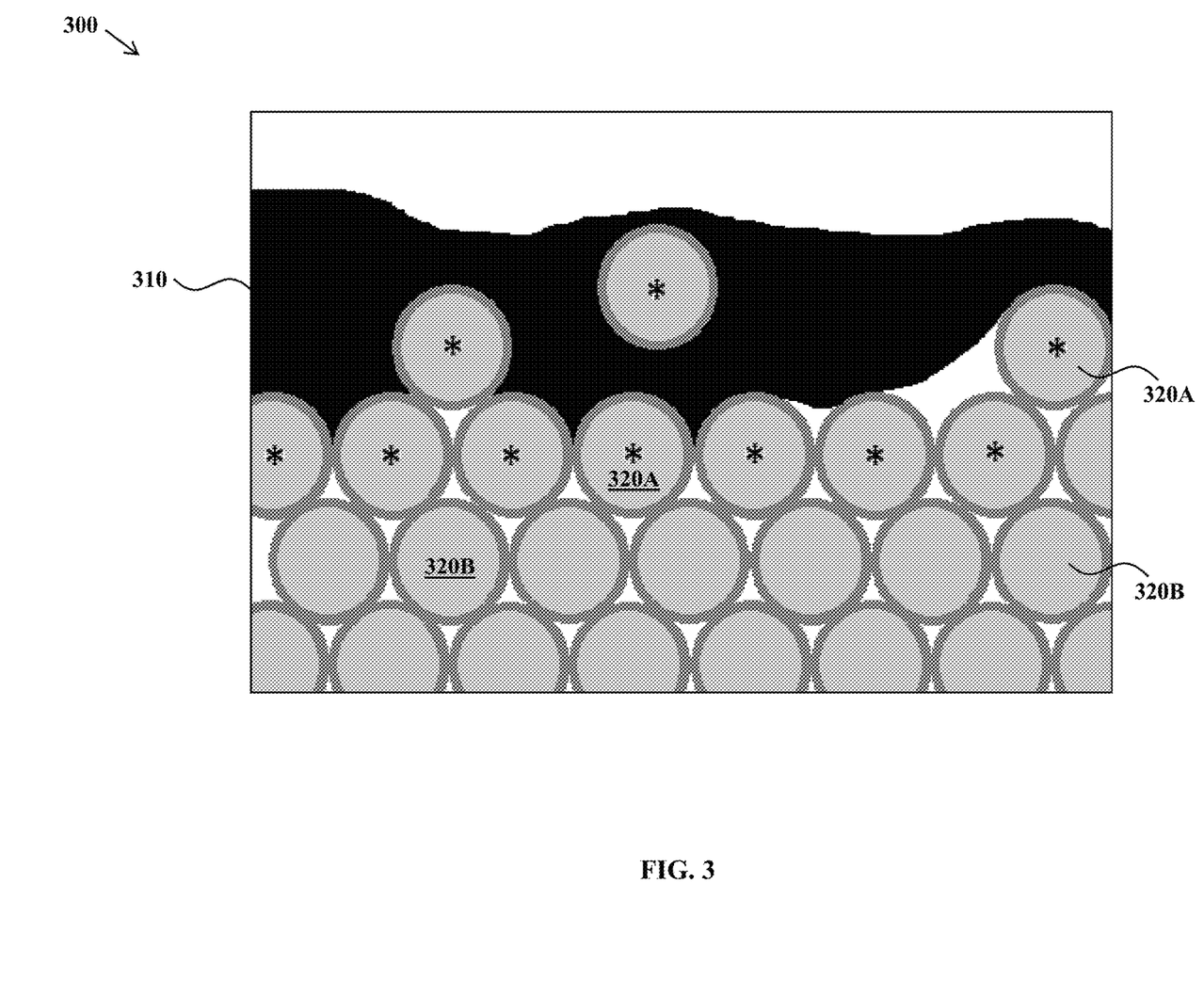
FIG. 3 depicts an exemplary system (2D side view) in which a colloidal barrier material is disposed on a substrate (particles denoted with *) but not disposed on bulk substrate particles. The colloidal barrier material is contiguous and is physically integral with the substrate.

With respect to the term "substrate" used herein, in reference to the disclosed and claimed subject matter is defined with respect to itself as the substance or material as a whole having the colloidal material applied to and/or on. Non-limiting examples of substrates are soil, grain, corn, soybeans, silage and biomass. With respect to the term "substrate surface" used herein, in reference to the disclosed and claimed subject matter when used with respect to what the colloidal material is being disposed onto, is defined as the portion of the substrate which is exposed for the emulsion to be disposed onto as opposed to the total potential surface area of the individual components contained within a given substrate. Substrate surface can also be distinguished from the bulk substrate, as shown in FIG. 3 for example.

With respect to the term "contiguous" used herein, in reference to the disclosed and claimed subject matter is defined as in actual contact with a substrate; touching, also in some part near, though not touching the substrate. Contiguous includes instances where portions of the substrate surface are in contact with colloidal barrier and portions are not touching the colloidal barrier though previously exposed and available for the emulsion to be disposed onto. Preferably, a contiguous colloidal barrier material covers at least 95%, more preferably at least 99%, and most preferably essentially all of the substrate surface that is available for the emulsion to be disposed onto.

With respect to the term "physically integral" used herein, in reference to the disclosed and claimed subject matter is defined as the colloidal barrier on the substrate such that a portion of the divisible portion of the substrate surface is incorporated into the barrier material such as by partially or completely covering, coating, encapsulating and/or surrounding. A non-limiting example of a divisible portion of a substrate are the corn kernels in a corn pile. A non-limiting example of a physically integral colloidal barrier is a colloidal barrier on a corn pile in which some kernels of corn are incorporated into the colloidal barrier.

A "barrier material" herein is generally described as being a layer on a selected substrate, such that the layer itself has a face in contact with the selected substrate and a second face that is opposite the selected substrate. In general, the face opposite the first face is generally understood to be facing air or the external environment with respect to the selected substrate as the internal environment. It is understood the barrier material is generally described as being a layer; however it is also understood the layer may have topography representative of the selected substrate that the barrier material is applied to. As such, this description will be understood as generalized and not representative of every instance at every scale or dimension.

Embodiments of the invention consist of multiple components combined with heat and agitation to form an emulsion. In embodiments the emulsion is formed in the process of combining the components or at least by the time all the components have been combined with heat and agitation. An embodiment includes the stepwise addition of components occurring by addition of the whole amount of a specific component at once or substantively in one addition. An embodiment includes a component added in more than one discrete addition. An embodiment includes more than one component being added in the same step. An embodiment includes certain components being pretreated prior to addition such as being preheated to a certain temperature prior to addition. An embodiment includes two or more components or a portion of the components combined prior to addition. In some embodiments the emulsion may be prepared with a reduced amount of one or more components with the remaining portion of the components added at a later time. An embodiment includes the addition of one or more additives to the emulsion.

An embodiment includes agitation provided by a stirring mechanism. An embodiment includes agitation provided by a pump. In the process of adding the components to form the emulsion, any means of agitation may be used that does not prevent the emulsion from forming. Embodiments of this invention include heating. An embodiment of this invention uses direct heat while other embodiments use indirect heat. An embodiment includes direct and indirect heat in the emulsion-colloid system.

Upon application to a selected substrate the emulsion is allowed to cool and solidify, thereby forming a barrier material. An embodiment uses a passive cooling mechanism to form the colloid. An embodiment uses an active cooling mechanism to form the colloid. An embodiment uses a mechanism to control the temperature of the emulsion within a specified temperature range. In an embodiment of the emulsion-colloid system, the temperature is controlled between about 20° C. to approximately 99° C. In an embodiment, the temperature of the emulsion-colloid system is not controlled but is maintained in the range of about 45-90° C.

In an embodiment, the temperature of at least one instance of the emulsion-colloid system is maintained in the range of about 45-90° C.

An embodiment of the invention consists of an emulsion formed by the combination of specific components with agitation and heat which, when the emulsion is then cooled to a lower temperature, the emulsion solidifies forming a colloid. In some embodiments the colloid formed after cooling the emulsion is an intermediate processing step. An embodiment includes the colloid being heated to form an emulsion and additives added to the second instance of the emulsion after which the emulsion is cooled to a lower temperature and a second instance of the colloid is formed. In some embodiments, the emulsion is processed such that the colloid is in the form of spheres of a diameter less than one inch. In some embodiments the emulsion is processed such that the colloid is in the form of pellets. In some embodiments the emulsion is processed such that the colloid formed is in the form of irregular shapes. In some embodiments the emulsion is processed such that the colloid is prepared for coating with one or more layers such as by a core-shell coating strategy.

An embodiment of the invention includes the colloid being heated prior to application to a substrate as an emulsion, wherein upon cooling, another instance of the colloid is formed. An embodiment includes the application of the emulsion from an application mechanism that moves with respect to the substrate. An embodiment includes an application of the emulsion from an application mechanism that is stationary relative to the substrate. An embodiment includes an application mechanism that sprays the emulsion on to a substrate. An embodiment includes an application mechanism in which the substrate is dipped partially or completely in the emulsion. Embodiments include non-limiting application mechanisms such as pouring, coating, curtain coating, rolling, transfer coating, scattering and other methods of application of the emulsion to a substrate such that a colloidal barrier is formed.

An embodiment includes the use of different additives which may be added to the first instance of the emulsion or after heating the colloid to form an emulsion after the first instance. An embodiment includes selection of one or more additives such as colorants, processing aids, bioactive agents, pesticides, insecticides, herbicides, micronutrients, macronutrients, reactive agents, antimicrobials, biostimulants, microorganisms, nanoparticles and/or polymers. An embodiment includes additives which may be added to a material used to coat the colloid. An embodiment includes the use of an additive with the emulsion-colloid system prior to the final instance of the colloid which results in the final colloid being in whole or in part non-reversable. An embodiment includes the use of an additive which modifies the degradation rate of the barrier material by chemical, physical and or biological activity.

An embodiment includes addition of additives at different points in space and/or time in the emulsion-colloid system. An embodiment of the emulsion-colloid system includes the ability to geographically separate the first-instance formation of the emulsion and the colloid from additional subsequent formations of the emulsion at one or more separate geographic locations. An embodiment of the emulsion-colloid system includes the first-instance formation of the colloid prior to transport to another location after which the second instance of the emulsion is formed, such as in a different city or state or similar separate geographic designation. An embodiment of the emulsion-colloid system includes the addition of one or more additives after the first-instance formation of the emulsion by addition of one or more additives to either the first-instance colloid or subsequent instances of the emulsion and/or the colloid of the emulsion-colloid system.

An embodiment provides the emulsion-colloid system in which an instance of the emulsion is disposed on a substrate where upon cooling a colloidal barrier material is formed. An embodiment provides the emulsion-colloid system in which an instance of the emulsion is disposed on a substrate from more than one mechanism which may be similar or different where upon cooling a colloidal barrier material is formed. An embodiment provides an emulsion disposed by spraying onto a substrate from a mechanism with one or multiple means of spraying. An embodiment provides an emulsion disposed by spraying onto a substrate from a mechanism with one or multiple means of spraying which consist of in part spray nozzles which may include different types of spray nozzles. An embodiment provides an emulsion, held at one temperature or a range of temperatures above 50° C. or more specifically between 60° C. and 99° C., disposed onto a substrate which is at another temperature below 45° C. where the emulsion forms, upon cooling, a colloidal barrier material. An embodiment utilizes an application mechanism that receives a colloid instance of the emulsion-colloid system which is heated forming an emulsion instance that is then disposed onto a substrate where after cooling the colloidal barrier material is formed. An embodiment utilizes an application mechanism that receives a colloid instance of the emulsion-colloid system which is heated forming an emulsion instance which is mixed with an additive prior to being disposed onto a substrate where after cooling the colloidal barrier material is formed. Embodiments of the colloidal barrier material include single application and more than one application of the emulsion to the substrate.

An embodiment of the colloidal barrier material provides the emulsion disposed onto a substrate where after cooling the colloidal barrier material is contiguous with the substrate, that is, the colloidal barrier material covers the surface of the substrate previously exposed and available for the emulsion to be disposed onto. An embodiment includes a substrate selected from but not limited to grain, seeds, soil, silage, plant roots, and lignocellulosic biomass. An embodiment includes a substrate that is composed of many individual parts such as the substrate comprising the surface of a grain pile which is composed of individual grain. An embodiment includes a substrate that is composed of many individual parts which are not uniform such as the substrate comprising the surface of soil that is composed of many non-uniform parts which are also not homogeneous.

An embodiment provides coverage of a substrate with barrier material in which the portion of the specific colloidal barrier surface area contains a portion of uncovered substrate area such that the portion of uncovered to covered area of the specific colloidal barrier surface area is between 1 and 5 percent. The uncovered area does not include portions not intended to be covered such as the exposed soil between specific areas of colloidal barrier applications in an agricultural setting. An embodiment provides coverage of a substrate with a colloidal barrier in which the portion of the specific portion of uncovered to covered area of the specific colloidal barrier area is less than 1 percent.

An embodiment provides an emulsion comprising water, gelatin, citric acid, glycerin and oil which form a colloidal barrier when cooled. An embodiment provides an emulsion-colloid system comprising water, gelatin, citric acid, glycerin and oil which form a colloidal barrier. An embodiment provides an emulsion comprising water, acid, gelling agent, plasticizer and an oil. An embodiment provides an emulsion containing water such as selected from one or more water sources such as well water, purified water, reverse osmosis water, process water (e.g., thin stillage from a corn-to-ethanol process), municipal water, soft water and/or hard water.

An embodiment provides an emulsion containing one or more wax or waxy substances. Waxes are a diverse class of organic compounds that characteristically consist of long alkyl chains and that are lipophilic, malleable solids near ambient temperatures. Waxes include higher alkanes and lipids, typically with melting points above about 40° C., melting to give low-viscosity liquids. Natural waxes may contain unsaturated bonds and include various functional groups such as fatty acids, primary and secondary alcohols, ketones, aldehydes and fatty acid esters. Synthetic waxes may contain long-chain aliphatic hydrocarbons (alkanes or paraffins) with or without functional groups. Waxes are typically insoluble in water but soluble in organic, nonpolar solvents. In this disclosure, "wax" is synonymous with waxy substance.

The wax or waxy substance may be selected from hexadecanoic or palmitic acid with $n=14$ (n is the number of carbon atoms in the main chain, i.e. not counting terminal carbon atoms), heptadecanoic or margaric or daturic acid with $n=15$, octadecanoic or stearic acid with $n=16$, eicosanoic or arachidic acid with $n=18$, docosanoic or behenic acid with $n=20$, tetracosanoic or lignoceric acid with $n=22$, hexacosanoic or cerotic acid with $n=24$, heptacosanoic or carboceric acid with $n=25$, octacosanoic or montanic acid with $n=26$, triacontanoic or melissic acid with $n=28$, dotriacontanoic or lacceroic acid with $n=30$, tritriacontanoic or ceromelissic or psyllic acid, with $n=31$, tetratriacontanoic or geddic acid with $n=32$, and/or pentatriacontanoic or ceroplastic acid with $n=33$. An embodiment provides a colloidal barrier containing one or more wax or waxy substances such as selected from soy wax, bees wax, palm wax, carnauba wax, candelilla wax, rice wax, sunflower wax, jojoba wax, ozokerite and/or paraffin wax. An embodiment provides a colloidal barrier containing one or more wax or waxy substances such as selected from microbially-derived wax, plant-derived wax, animal-derived wax and/or petroleum-derived wax. An embodiment provides selecting a functionalized wax such as a wax functionalized with UV-curable group. An embodiment includes an emulsion containing a wax as an additive including one or more functionalized wax or waxy substance. An embodiment provides an emulsion-colloid system where some or all of the wax or waxy substance is added after the first instance of the emulsion. Embodiments containing a wax or waxy substance preferentially include a surfactant or more specifically an emulsifier, such as (but not limited to) Polysorbate 80, lecithin, or carrageenan.

An embodiment provides an emulsion containing one or more oils such as selected from petroleum-based oil, plant-based oil and/or animal-based oil. An embodiment includes selecting oil that is unrefined or partially refined. An embodiment includes selecting oil that is refined such as refined bleached and deodorized soybean oil. An embodiment includes selecting one or more oils such as mineral oil, medium chain triglyceride oil, vegetable oil, essential oil, organic oil, liquid paraffin, lipid and or silicone oil. An embodiment provides an emulsion containing one or more oils such as selected from the group consisting of palm oil, coconut oil, olive oil, cocoa oil, chicken fat, beef tallow, porcine tallow, soy oil, rapeseed oil, canola oil, palm kernel oil, corn oil, waste vegetable oil, Chinese tallow, sunflower oil, cotton seed oil, microalgae oil, macroalgae oil, Cuphea oil, flax oil, peanut oil, choice white grease, lard, *Camelina sativa* oil, mustard seed oil, cashew nut oil, oat oil, lupine oil, kenaf oil, calendula oil, hemp oil, coffee oil, linseed (flax) oil, hazelnut oil, euphorbia oil, pumpkin seed oil, coriander oil, camellia oil, sesame oil, safflower oil, rice oil, tung oil, copra oil, opium poppy oil, castor bean oil, pecan oil, jojoba oil, jatropha oil, macadamia oil, Brazil nut oil, avocado oil, fossil oil or a distillate fraction thereof, and combinations thereof. An embodiment provides an emulsion containing one or more functionalized oils. An embodiment provides an emulsion containing an oil as an additive including one or more functionalized oils.

An embodiment provides an emulsion containing one or more emulsifiers such as selected from glyceryl monostearate, glycerol distearate, glycerol oleate, diacetyl tartaric acid monoglyceride, sodium caseinate, sucrose fatty acid esters, ethoxylated alcohols, carboxylates, sodium isethionate, lecithin, calcium stearoyl lactylate, polyelectrolytes and/or mustard powder. An embodiment provides an emulsion containing one or more gelling agents such as selected from agar, agarose, alginate, gelatin, carrageenan, carboxymethyl cellulose, guar gum, sodium pectate and/or gum tragacanth.

After preparing the emulsion it may be used immediately for applying to a selected substrate and/or may be stored for later application to a selected substrate. Substrates include, but are not limited to, grain such as a replacement or augment to plastic grain coverings, soil such as a replacement or augment to agricultural mulch plastics or as a replacement for mulch or geotextile, silage such as a replacement or augment to a silage covering, or root balls such as a replacement or augment to root ball coverings.

In some embodiments, the barrier material forms a non-reusable barrier material on a selected substrate. As intended herein, a "non-reusable barrier material" is a colloidal barrier material that is physically integral with a substrate such that the colloidal barrier material does not form a simple layer or sheet that can be physically removed from the substrate. Because the colloidal barrier material is physically non-removable from the substrate, the colloidal barrier material cannot be stored or transported for layer use as another barrier material. However, other uses or reuses are possible for the colloidal barrier material, as described elsewhere, such as incorporation into soil to provide plant growth inputs. Also note that technically speaking the colloidal barrier material may be mechanically removed from a part of substrate through tedious techniques such as micro-scraping. However, such a technique would be impractical, uneconomic, and would not result in a single colloidal barrier material that could be directly reused as a barrier material. Similarly, the colloid instance disposed on the substrate could be thermally treated to remake an emulsion instance. However, such a technique would also not result in a single colloidal barrier material that could be directly reused as a barrier material.

In some embodiments, the barrier material has water resistance conveyed by the generally understood by one knowledgeable in the field as the water-resistant properties attributed to non-water soluble waxes. Non-soluble waxes such as paraffin waxes and stearine are insoluble in water and thus provide water-resistance to the barrier materials. Compositions described herein incorporating non-water soluble waxes form emulsions that, after forming a barrier on the selected substrate, have the property of water resistance conferred by in part the non-soluble wax contained in the barrier material.

In some embodiments, the product after the process of preparation of the emulsion may be applied directly to a selected substrate or it may be conveyed by pumping, gravity or other method of conveyance for a period for later application. The emulsion may be cooled prior to, during or after a process by which the resulting solidified material is made ready for later application. It is understood in embodiments in which the emulsion is cooled prior to application to a selected substrate that heat will generally be required to once again form the emulsion and as such the characteristics of such embodiments are such as to allow reversible formation of the liquid and solid states of the colloid for at minimum one cycle, thereby enabling the formation in the first instance and then application in the second instance of the emulsion.

In some embodiments, the emulsion prepared is irreversibly solidified resulting in a barrier material derived from a colloidal material but which is itself not necessarily considered a colloid. In such embodiments, the components of the emulsion state are similarly described by a colloidal paint which after application to a selected substrate (e.g. a wall) and drying or curing, the dried product of the process is no longer formally considered a colloid.

According to some embodiments, the properties of the colloidal barrier material are dependent on the properties of the ingredients and ratio of components used in the composition of the starting liquid emulsion and the final barrier material characteristics. Some properties of the barrier are dependent or attributable to all the ingredients, whereas other properties (e.g., color of the final material) may be dependent or attributable to a single or less than all the other ingredients. Properties of the barrier material may be tailored for specific seasons in which a specified barrier composition will be primarily utilized. A barrier that primarily functions in the winter may be designed for temperatures generally below 0° C. but not above 35° C., whereas a barrier that primarily functions in the summer may be designed for temperatures generally above 10° C. and more than 35° C. but not below 0° C.

In some embodiments, functional components are selected to provide specific attributes to the final barrier material. It is understood that some functional components may provide multiple attributes. It is understood that some functional components may be considered additives. Additives are understood to be functional components, in some embodiments. Different additives may be added to a standard emulsion formulation imparting different attributes in the final barrier, dependent on which additives or functional components were added. In some embodiments, additives provide chemical reactivity such as crosslinking functionality to improve barrier film stiffness, hardness or another physical property. In some embodiments the additive provides specific barrier properties including, but not limited to, gas impermeability, UV absorption, light scattering, catalytic deactivation, chemical absorption or other such barrier function. Additives may include colorants, dyes, pigments, or other coloring agents. Additives may include cryoprotectants, ultraviolet light protectants, nanoparticles, or other materials.

Biochar may be included as an additive in some compositions of the invention. Biochar is the solid material obtained from the thermochemical conversion of biomass in an oxygen-limited environment. In certain embodiments, biochar is used to provide color to the formulation, enhance chemical absorptivity and impart dose-dependent water dissolution characteristics. In these or other embodiments, biochar is used as a sorbent prior to addition to the emulsion so that specific chemicals, minerals or other materials can be added to the emulsion and final barrier material. In these or other embodiments specific to soil substrates, biochar is added to the emulsion to provide future soil carbon after the barrier material is incorporated into the soil after use. Biochar may be provided in any suitable particle size, such as nanoparticles.

In some embodiments, an additive or plurality of additives provide primarily functionality in the emulsion state. In some embodiments, an additive or plurality of additives provides primarily functionality in the storage state after emulsion preparation prior to application. In some embodiments, an additive or plurality of additives provides primarily functionality in the barrier material. In some embodiments, an additive or plurality of additives provides primarily functionality after the barrier material state. In some embodiments, a component or ingredient or plurality of components and/or ingredients provides multiple properties, reducing the total number of components and/or additives in the composition otherwise required.

Some variations provide an emulsion-colloid system for forming a colloidal barrier material disposed on a substrate, the emulsion-colloid system comprising:
 a hydrophilic first liquid;
 an acid;
 a gelling agent;
 a hydrophobic second liquid;
 a plasticizer; and
 optionally one or more additives,
wherein the emulsion-colloid system is characterized by a first instance that is a flowable emulsion above 60° C. (or another temperature) and less than the boiling point of the first liquid, wherein the emulsion-colloid system is characterized by a second instance that is a colloid below 40° C. (or another temperature that is lower than the temperature at which the system is flowable), and wherein the emulsion-colloid system is capable of reversible transition, mediated by temperature, between the first instance and the second instance.

In some embodiments, the emulsion-colloid system comprises:
 5 wt % to 25 wt % of a hydrophilic first liquid;
 0.01 wt % to 5 wt % an acid;
 1 wt % to 21 wt % a gelling agent;
 5 wt % to 25 wt % of a hydrophobic second liquid;
 1 wt % to 50 wt % of a plasticizer; and
 optionally 0.01 wt % to 50 wt % of one or more additives, Some variations provide an emulsion-colloid system for forming a colloidal barrier material disposed on a substrate, the emulsion-colloid system comprising:
 a hydrophilic first liquid;
 an acid;
 a gelling agent;
 a hydrophobic second liquid;
 a wax;
 a plasticizer;
 an emulsifier; and
 optionally one or more additives,
wherein the emulsion-colloid system is characterized by a first instance that is a flowable emulsion above 60° C. (or another temperature) and less than the boiling point of the first liquid, wherein the emulsion-colloid system is characterized by a second instance that is a colloid below 40° C. (or another temperature that is lower than the temperature at which the system is flowable), and wherein the emulsion-colloid system is capable of reversible transition, mediated by temperature, between the first instance and the second instance.

In some embodiments, the emulsion-colloid system comprises:
 5 wt % to 25 wt % of a hydrophilic first liquid;
 0.01 wt % to 5 wt % an acid;
 1 wt % to 21 wt % a gelling agent;
 5 wt % to 25 wt % of a hydrophobic second liquid;
 15 wt % to 40 wt % of a wax;
 1 wt % to 45 wt % of a plasticizer;
 0.01 wt % to 4 wt % of an emulsifier; and
 optionally 0.01 wt % to 15 wt % of one or more additives.

In certain embodiments, the emulsion-colloid system contains:
 5 wt % to 25 wt % water;
 0.01 wt % to 5 wt % citric acid;
 5 wt % to 10 wt % gelatin;
 10 wt % to 45 wt % glycerin;
 0.01 wt % to 5 wt % guar gum;
 0.01 wt % to 5 wt % mustard powder;
 55 wt % to 25 wt % soybean oil;
 15 wt % to 40 wt % stearine;
 1 wt % to 50 wt % biochar; and
 0.01 wt % to 5 wt % of one or more additives.

In certain embodiments, the emulsion-colloid system contains:
 5 wt % to 25 wt % water;
 0.01 wt % to 5 wt % citric acid;
 5 wt % to 10 wt % gelatin;
 10 wt % to 45 wt % glycerin;
 0.01 wt % to 5 wt % guar gum;
 0.01 wt % to 5 wt % mustard powder;
 5 wt % to 25 wt % soybean oil;
 15 wt % to 40 wt % stearine;
 1 wt % to 2 wt % titanium dioxide; and
 0.01 wt % to 5 wt % colorant, dye, pigment, or other coloring agent.

Some embodiments can be understood with reference to the accompanying non-limiting drawings, which depict the emulsion-colloid system in the form of a colloidal barrier material.

Figure 1:
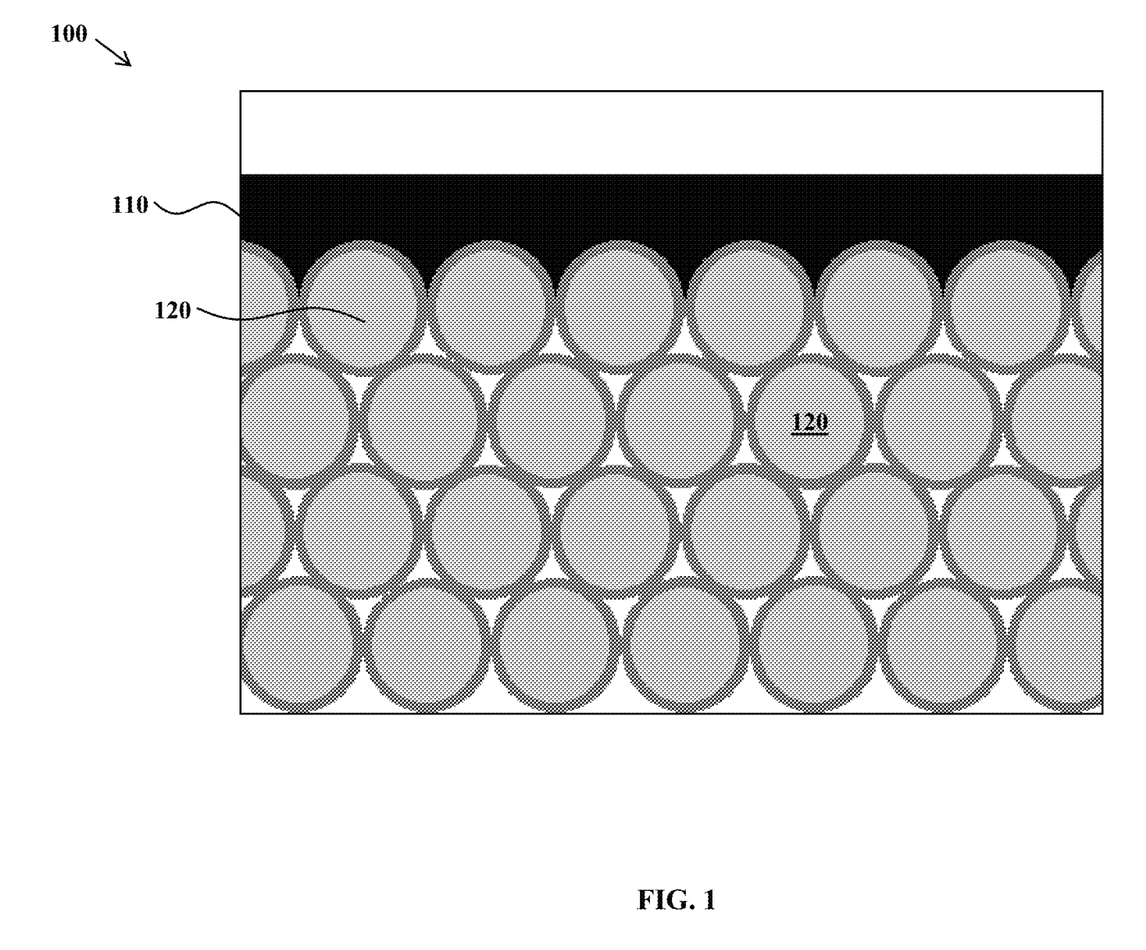
FIG. 1 depicts an exemplary system (2D side view) in which a colloidal barrier material is disposed on a substrate, wherein the colloidal barrier material is contiguous and is physically integral with a top layer of substrate.

FIG. 1 depicts an exemplary system 100 in which a colloidal barrier material 110 is disposed on a substrate 120, which is in the form of discrete particles. The colloidal barrier material 110 is contiguous and is physically integral with a top layer of substrate 120. In FIG. 1, submerged layers of substrate 120 are not disposed with colloidal barrier material 110, but it will be understood that in some embodiments, colloidal barrier material 110 infiltrates into submerged layers of substrate 120. Note that substrate 120 particles are shown as spherical but may alternatively be non-spherical, such as elliptical, fibrillar, rod-shaped, or other shapes. FIG. 1 is a two-dimensional side view of a portion of a three-dimensional system that generally may contain many more substrate particles than this illustration.

Figure 2:
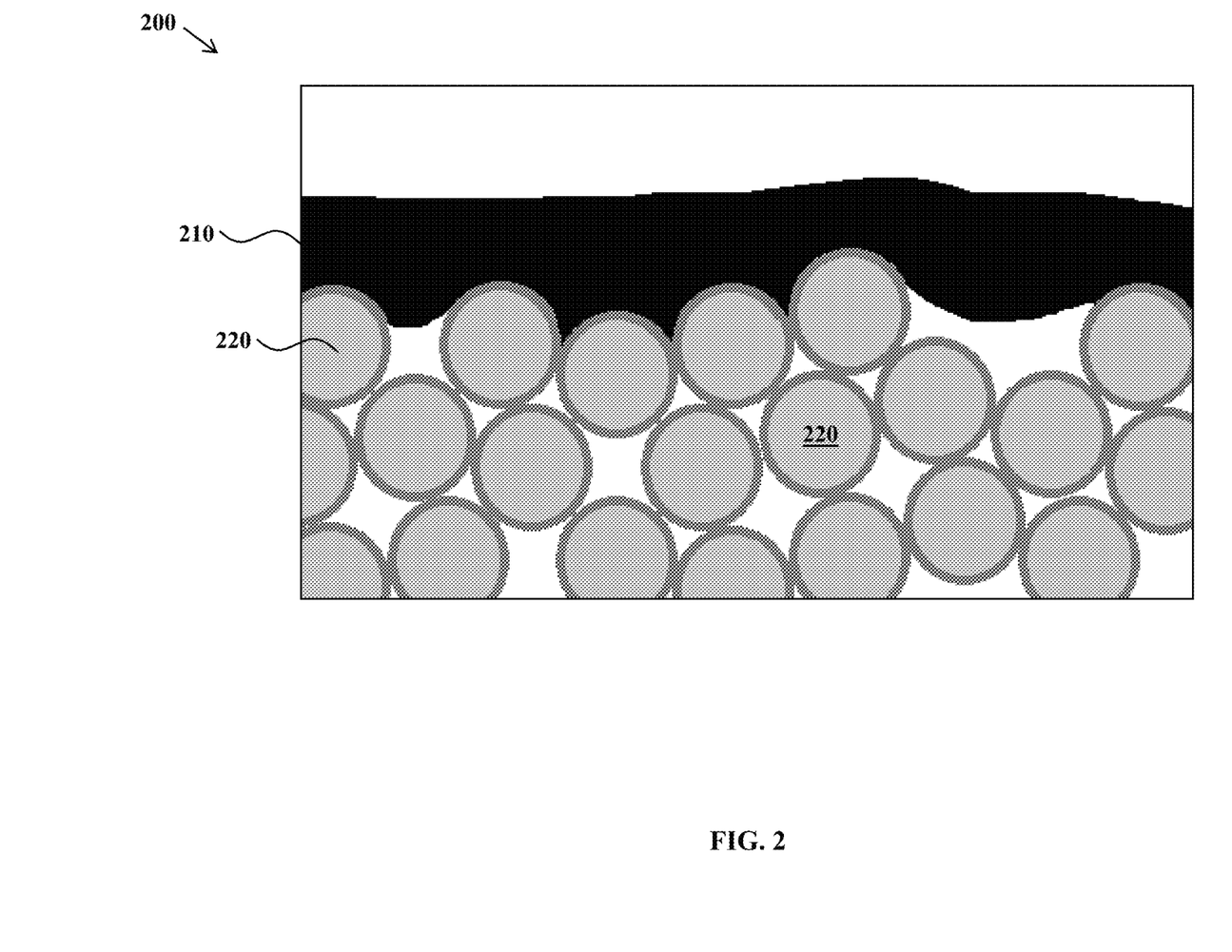
FIG. 2 depicts an exemplary system (2D side view) in which a colloidal barrier material is disposed on a substrate, wherein the colloidal barrier material is contiguous and is physically integral with a top layer of substrate.

FIG. 2 depicts an exemplary system 200 in which a colloidal barrier material 210 is disposed on a substrate 220, which is in the form of discrete particles. The colloidal barrier material 210 is contiguous and is physically integral with a top layer of substrate 220. In FIG. 2, submerged layers of substrate 220 are not disposed with colloidal barrier material 210, but it will be understood that in some embodiments, colloidal barrier material 210 infiltrates into submerged layers of substrate 220. Note that substrate 220 particles are shown as spherical but may alternatively be non-spherical, such as elliptical, fibrillar, rod-shaped, or other shapes. FIG. 2 is a two-dimensional side view of a portion of a three-dimensional system that generally may contain many more substrate particles than this illustration.

FIG. 3 depicts an exemplary system 300 in which a colloidal barrier material 310 is disposed on a substrate 320A, which is in the form of discrete particles. The substrate 320A (which particles are also denoted with *) is distinguished in this drawing from bulk substrate 320B. Substrate 320A may also be referred to as a substrate surface. The colloidal barrier material 310 is contiguous and is physically integral with substrate 320A. One particle of substrate 320A is shown as being fully encapsulated by colloidal barrier material 310, in the middle of that region. Bulk substrate 320B is not disposed with colloidal barrier material 310. Note that substrate 320 particles are shown as spherical but may alternatively be non-spherical, such as elliptical, fibrillar, rod-shaped, or other shapes. FIG. 3 is a two-dimensional side view of a portion of a three-dimensional system that generally may contain many more substrate particles than this illustration.

Figure 4:
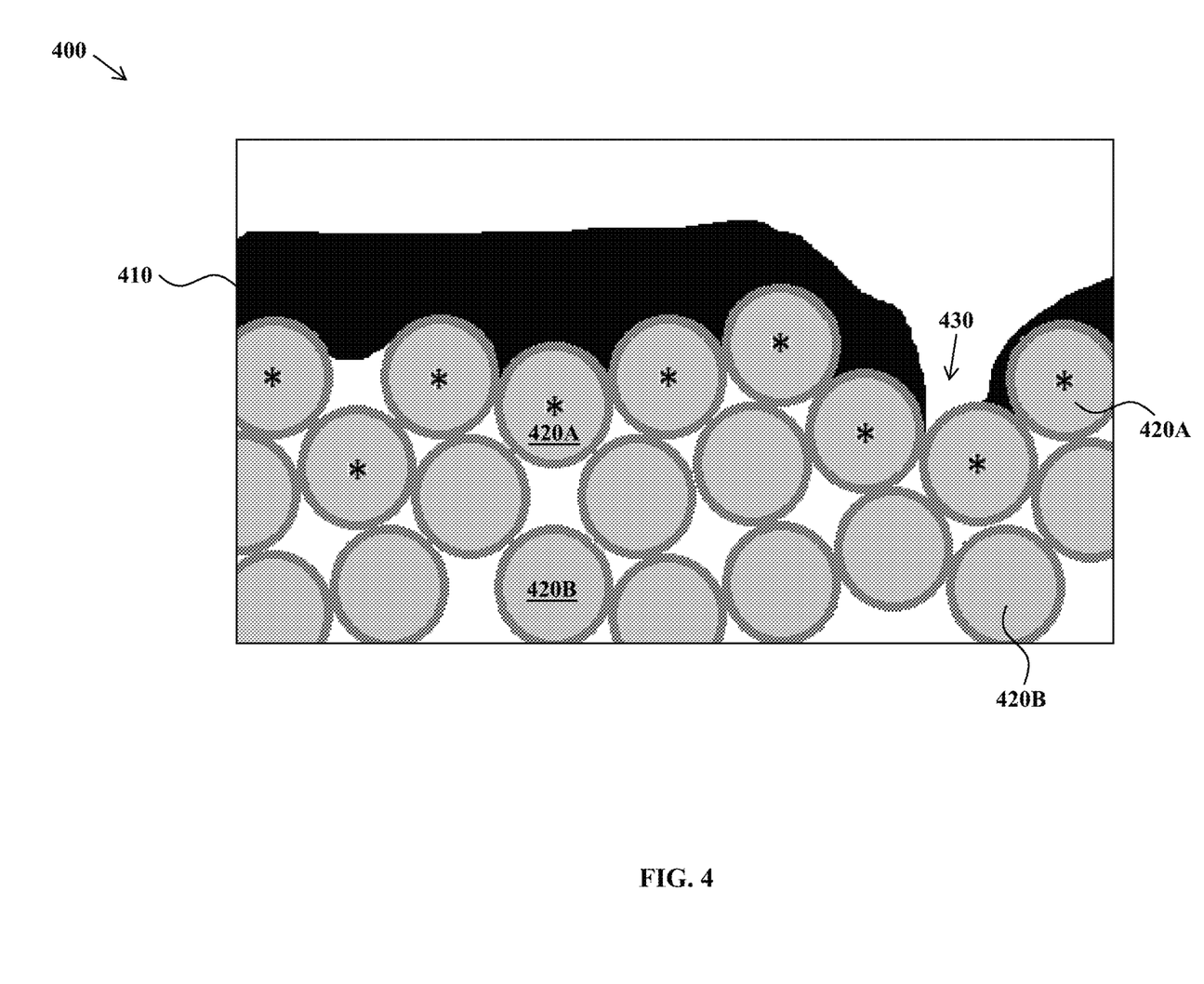
FIG. 4 depicts an exemplary system (2D side view) in which a colloidal barrier material is disposed on a substrate (particles denoted with *) but not disposed on bulk substrate particles. The colloidal barrier material is contiguous and is physically integral with the substrate.

FIG. 4 depicts an exemplary system 400 in which a colloidal barrier material 410 is disposed on a substrate 420A, which is in the form of discrete particles. The substrate 420A (which particles are also denoted with *) is distinguished in this drawing from bulk substrate 420B. Substrate 420A may also be referred to as a substrate surface. The colloidal barrier material 410 is physically integral with substrate 420A. The colloidal barrier material 410 does not cover substrate 420A at a defect region 430, but because defect region 430 represents less than 5% of the total available surface area of substrate 420A, the colloidal barrier material 410 is regarded as contiguous with substrate 420A. Bulk substrate 420B is not disposed with colloidal barrier material 410. Note that substrate 420 particles are shown as spherical but may alternatively be non-spherical, such as elliptical, fibrillar, rod-shaped, or other shapes. FIG. 4 is a two-dimensional side view of a portion of a three-dimensional system that generally may contain many more substrate particles than this illustration.

In some embodiments, a method of using the emulsion includes a step to spray the emulsion onto a selected substrate, forming a layer that after cooling forms a barrier material. In some embodiments, a method of using the emulsion includes a step to spray the emulsion onto a selected substrate, forming a layer that after cooling and chemical reaction commonly understood as curing, forms a barrier material. In some embodiments, spraying of the emulsion involves conveying the emulsion by pressure, vacuum, mechanical pumping, or a combination of means of conveyance including individually or in combination with other methods not listed here but understood by one skilled in the art as providing a means of conveyance. In some embodiments, the method of application includes a portion which may be a minor or a substantial portion of the emulsion-contacting surfaces to be heated or held at a temperature which enables the flow of the emulsion. In some other embodiments, a method of application may include portions which are of one temperature in which the colloid is a solid and yet another portion or plurality of portions in which the temperature is such that the emulsion-colloid system is a liquid. These embodiments include a means to transition the emulsion-colloid system from solid to liquid and for application of the liquid emulsion to the selected substrate.

In some embodiments, the barrier material is preferred to be continuous over the selected substrate. In some embodiments, the barrier material is mostly continuous with some discontinuity understood to be characterized by the areas of discontinuity being preferably less than 5% of the total barrier material area and more preferably less than 1% of the total barrier material area. In some embodiments, the barrier material may be applied only to a portion of the total selected substrate. In some embodiments, the selected substrate may be non-homogeneous in composition, size, chemical reactivity or any combination singularly or a plurality of these. In some embodiments, the barrier material may preferentially be a barrier to only a portion of the selected substrate and as a partial or incomplete barrier to another portion of the selected substrate and potentially have no barrier or limited barrier activity for yet another portion of the selected substrate. The barrier material may be chemically reactive over time by design or by nature of the composition and/or the composition of the environment surrounding the barrier material.

In some embodiments, barrier material applied to soil is directly incorporated into the soil after use as a barrier. In these embodiments, the barrier material optionally contains additives which primarily provide attributes which improve soil quality. Additives may include individual or a plurality of nitrogen, phosphorous or potassium fertilizers. The fertilizers may be inorganic or organic including those defined as slow or fast release. The additives may include any combination or individually incorporated herbicides, pesticides, insecticides and fungicides.

In some embodiments, the barrier material may include an additive which controls the degradation rate of the barrier material. Such an additive may increase or decrease the barrier material stability relative to the formulation without the additive. In some embodiments, the colloidal barrier material is biodegradable and/or compostable.

In some instances, additives may be categorized as having attributes that improve the barrier material for certain uses. In other instances, additives may be categorized as having attributes that affect the selected substrate or the substrate interaction with the barrier material. In yet other instances, additives may be categorized as having attributes that affect the interaction of the barrier material with the external environment relative to the internal substrate environment.

Some variations provide a method of making a colloidal barrier material, the method comprising:

(a) providing a starting formulation comprising a hydrophilic first liquid, a hydrophobic second liquid, and a first solid;

(b) heating the starting formulation to a first temperature from about 60° C. to about 100° C., thereby forming an emulsion comprising the first liquid, the second liquid, and a dispersed liquid phase of the first solid;

(c) applying the emulsion onto a substrate, thereby forming an emulsion layer disposed on the substrate; and (d) solidifying the emulsion layer at a second temperature from about 0° C. to about 45° C., thereby forming a colloidal barrier material disposed on the substrate.

Some variations provide a method of making a colloidal barrier material, the method comprising:

(a) providing a starting formulation comprising a hydrophilic first liquid, a hydrophobic second liquid, and a first solid;

(b) heating the starting formulation to a first temperature from about 60° C. to about 100° C., thereby forming an emulsion containing the hydrophilic first liquid, a hydrophobic second liquid, and a liquid phase of the first solid;

(c) immediately following step (b) or at a later time, cooling the emulsion to a second temperature from about 0° C. to about 45° C., thereby forming a colloidal intermediate material;

(d) after a period of storage time, heating the colloidal intermediate material to a third temperature from about 60° C. to about 100° C., thereby reforming the emulsion containing the hydrophilic first liquid, a hydrophobic second liquid, and a liquid phase of the first solid;

(e) applying the emulsion onto a substrate, thereby forming an emulsion layer disposed on the substrate;

(f) solidifying the emulsion layer at a fourth temperature from about 0° C. to about 45° C., thereby forming a colloidal barrier material disposed on the substrate, wherein the colloidal barrier material contains the first liquid and the first solid; and (g) optionally repeating steps (c) and (d) multiple times.

The substrate may an agricultural substrate, such as a substrate selected from the group consisting of grain, soil, silage, plants, plant roots, lignocellulosic biomass (e.g., corn stover), and combinations thereof.

In some embodiments, the applying in step (c) is continuous or intermittent spraying.

In some embodiments, during step (c) and/or step (d), at least a portion of the emulsion layer crosslinks to form crosslinked material within the colloidal barrier material.

The colloidal barrier material may be in the form of a continuous or discontinuous layer disposed on the substrate. In some embodiments, the colloidal barrier material is infiltrated within the substrate.

Following step (d), after a period of time during which the colloidal barrier material functions as a barrier, the colloidal barrier material may be incorporated directly into the substrate.

The colloidal barrier material may further comprise one or more additives selected from the group consisting of cross-linking agents, photoreactive polymers, gas-impermeability agents, UV-absorption agents, light-scattering agents, catalyst deactivators, chemical-absorption agents, fertilizers, herbicides, pesticides, insecticides, fungicides, stabilizers, and fire retardants. Optionally, one or more additives are incorporated into the substrate.

The method may further comprise a step of irreversibly solidifying the colloidal barrier material, thereby forming a solid barrier material disposed on the substrate.

In some embodiments, following step (d), after a period of time during which the colloidal barrier material functions as a barrier, the colloidal barrier material is biodegraded.

Steps (a), (b), (c), and (d) may be all co-located at a single site. Steps (a), (b), (c), and (d) may all be located at different sites. One or more steps may be located at a first site, one or more steps may be located at a second site, and so on.

EXAMPLES

Example I

Preparation of an embodiment of the emulsion-colloid system began with the preparation of an emulsion which started with pre-weighing water, gelatin, citric acid monohydrate, glycerin (neat), soy oil (high oleic) to the proportions 22.46, 10.11, 0.04, 44.93 and 22.46% weight/weight total respectively. Water, citric acid and gelatin were combined with mixing and heat at approximately 44° C. With mixing and increased heat glycerin was added followed by soy oil with final temperature of the emulsion being approximately 60° C. The completed first instance of the emulsion was then poured onto wax paper where it cooled at room temperature forming a first instance of the colloid. The first instance of the colloid was then removed from the wax paper and heated to approximately 60° C. with mixing forming a second instance of the emulsion after which it was poured onto wax paper where it cooled at room temperature forming a second instance of the colloid. This example shows the thermally mediated reversibility of the emulsion-colloid system.

Example II

Preparation of an embodiment of the colloidal barrier material began with pre-weighing 2,940 g water, 5.276 g citric acid monohydrate, 1,320 g gelatin, 5,870 g crude glycerin (feed grade, soy biodiesel process derived), 146.72 g titanium dioxide, 78.35 g guar gum, 5,280 g stearine flakes, 195.62 g ground mustard, and 2,932 g mineral oil. Water, citric acid and gelatin were combined with mixing and heat at approximately 44° C. With mixing and increased heat glycerin was added followed by guar gum and ground mustard. The soy oil was added slowly with mixing and heat. Finally, melted stearine flakes were added with the final temperature of the emulsion being approximately 60° C. The completed emulsion was transferred to a plastic watering can with enlarged watering holes. The emulsion was then drizzled over the surface of a pile of haylage where the emulsion cooled and formed a colloidal barrier material. This example shows the application of an emulsion onto a substrate, followed by conversion of the emulsion into a colloid on the substrate.

Example III

Preparation of an embodiment of the colloidal barrier material began with combining 127.49 g tap water, 0.2129 g citric monohydrate and 57.35 g gelatin with mixing and heat at approximately 44° C. With mixing and increased heat 253.56 g crude glycerin was added followed by 3.376 g guar gum, 8.539 g ground mustard and 6.374 g titanium dioxide. To this 126.87 g mineral oil was added with mixing and heat. Finally, 229.79 g of melted stearine flakes were added with the final temperature of the emulsion being approximately 60° C. After mixing the material was disposed onto a substrate and cooled after which it provided barrier protection. In this example the substrate was corn kernels and the emulsion was poured over the substrate surface to form a colloidal barrier. This example shows the application of an emulsion onto a corn substrate, followed by conversion of the emulsion into a colloid on the corn substrate.

Example IV

Preparation of an embodiment of the colloidal barrier material began with pre-weighing water, citric acid monohydrate, gelatin, glycerin, guar gum, ground mustard, mineral oil, stearine, and titanium dioxide to the proportions 15.64, 0.03, 7.04, 31.27, 0.42, 1.04, 15.64, 28.14 and 0.78% weight/weight total respectively. Water, citric acid and gelatin were combined with mixing and heat to approximately 40° C. to which glycerin, guar gum, ground mustard and titanium dioxide were added with constant heat to approximately 62° C. with mixing. To this the mineral oil was added followed by slowly adding the stearine with heating to 62° C. and mixing. After mixing the material was disposed onto a substrate and cooled after which it provided barrier protection. In this example the substrate was corn kernels and the emulsion was poured over the substrate surface to form a colloidal barrier. This example shows the application of an emulsion onto a corn substrate, followed by conversion of the emulsion into a colloid on the corn substrate.

Example V

Preparation of an embodiment of an emulsion-colloid system began with the preparation of approximately five gallons of emulsion in Waseca, Minn. Preparation of an emulsion began with combining 2,930 g tap water, 5.28 g citric monohydrate and 1,320 g gelatin (Fisher Scientific Type B) with mixing and heat at approximately 45° C. With mixing and increased heat 5,870 g crude glycerin was added followed by 78 g guar gum, 196 g ground mustard and 147 g titanium dioxide. To this 2,933 g high oleic soybean oil was added with mixing and heat. Finally, 5,280 g of melted partially hydrogenated soybean wax were added with the final temperature of the emulsion (first instance) being approximately 60° C. After mixing the material was disposed into a five-gallon bucket and left to cool, forming a first instance of the colloid. The first instance of the colloid was transported at room temperature to a demonstration facility near Chicago Ill. At the demonstration facility the colloid was removed from the bucket in pieces and placed in a 10-gallon direct-fire melt kettle with recirculation and hand agitator. The kettle was attached to a 1-inch Graco double diaphragm pump with powered by a Rolair air compressor with 5.5 HP Honda engine. The system assembled by NAC Supply, Inc. was fitted with a ½-inch applicator hose with spray wand having a single flat fan 3.58-mm diameter nozzle. In the system with heat and mixing provided by the recirculation pump and hand mixer, the first-instance colloid was melted and a second-instance emulsion formed at approximately 70° C. Using the spray system the emulsion was sprayed on soil (as substrate) at the demonstration site and a colloidal barrier material (second-instance colloid) formed after cooling and solidification. This example shows the thermally mediated reversibility of the emulsion-colloid system that, in the colloid state, is disposed on a soil substrate.

Example VI

Preparation of an embodiment of the colloidal barrier system began with the preparation of emulsion by pre-weighing water, citric acid monohydrate, glycerin, gelatin, guar gum, ground mustard, soybean oil, stearine, titanium dioxide and black food coloring to the proportions 15.5, 0.03, 31.05, 6.98, 0.41, 1.04, 15.52, 27.93, 0.78 and 0.77% weight/weight total respectively. The emulsion was prepared similar to Example IV with the food coloring added after the stearine. The emulsion was disposed onto wax paper to cool. From the colloid approximately 4 cm² pieces were removed and placed in 100 g of soil for incubation in a controlled humidity and temperature incubator. After 46 days of incubation the colloid samples were no longer identifiable after sieving, indicating the samples biodegraded during incubation in soil. This example shows the application of an emulsion onto a soil substrate, followed by conversion of the emulsion into a colloid on the soil substrate, and then biodegradation of the colloid on the substrate.

Example VII

Preparation of an embodiment of the emulsion-colloid system began with the preparation of approximately five gallons of emulsion in Waseca, Minn. Preparation of the emulsion began as described in Example V with the exception that triple pressed stearic acid wax replaced the soybean wax and after the addition of wax 145 g of black aqueous food coloring was added. The emulsion was disposed in five approximately equal portions contained in five separate plastic bags to cool forming the first instance of the colloid. The first instance colloid was transported to Lamberton, Minn. and all five portions added to the same application mechanism described in Example V. After formation of the second instance of the emulsion it was sprayed onto soil in the place of agricultural mulch film. After formation of the colloidal barrier, transplants were placed in the soil substrate through the colloidal barrier and grown. This example shows the application of an emulsion onto a soil substrate, followed by conversion of the emulsion into a colloid on the soil substrate, and the formation of a colloidal barrier in substitution of plastic mulch film.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. An emulsion-colloid system, said emulsion-colloid system comprising:
   5 wt % to 25 wt % of a hydrophilic first liquid;
   0.01 wt % to 5 wt % an acid;
   1 wt % to 21 wt % a gelling agent;
   5 wt % to 25 wt % of a hydrophobic second liquid;
   1 wt % to 50 wt % of a plasticizer; and
   optionally 0.01 wt % to 50 wt % of one or more additives,
   wherein said emulsion-colloid system is a flowable emulsion above 60° C. and less than the boiling point of said hydrophilic first liquid, wherein said emulsion-colloid system is a colloid below 40° C., wherein said emulsion-colloid system is capable of reversible transition, mediated by temperature, between said flowable emulsion and said colloid, wherein said emulsion-colloid system is in the form of a colloidal barrier material disposed on a substrate, and wherein said substrate is selected from the group consisting of grain, soil, silage, plants, plant roots, and lignocellulosic biomass.

2. The emulsion-colloid system of claim 1, wherein said hydrophilic first liquid is water, and wherein said water is selected from the group consisting of well water, purified water, reverse osmosis water, process water, municipal water, soft water, hard water, tap water, and combinations thereof.

3. The emulsion-colloid system of claim 1, wherein said acid is selected from the group consisting of mineral acids, organic acids, carboxylic acids, and combinations thereof.

4. The emulsion-colloid system of claim 1, wherein said gelling agent is selected from the group consisting of agar, agarose, alginate, gelatin, carrageenan, carboxymethyl cellulose, guar gum, sodium pectate, gum tragacanth, and combinations thereof.

5. The emulsion-colloid system of claim 1, wherein said hydrophobic second liquid is selected from the group consisting of petroleum-based oil, plant-based oil, animal based-oil, and combinations thereof.

6. The emulsion-colloid system of claim 1, wherein said plasticizer comprises glycerin derived from a petroleum source, a plant source, an animal source, or combinations thereof.

7. The emulsion-colloid system of claim 1, wherein said additives are selected from the group consisting of cross-linking agents, photoreactive polymers, gas-impermeability agents, UV-absorption agents, light-scattering agents, catalyst deactivators, chemical-absorption agents, fertilizers, herbicides, pesticides, insecticides, fungicides, stabilizers, nanoparticles, fire retardants, emulsifiers, waxes, viscosity modifiers, colorants, and combinations thereof.

8. The emulsion-colloid system of claim 1, wherein said colloidal barrier material is a contiguous layer that is physically integral with said substrate.

9. An emulsion-colloid system, said emulsion-colloid system comprising:
    5 wt % to 25 wt % of a hydrophilic first liquid;
    0.01 wt % to 5 wt % an acid;
    1 wt % to 21 wt % a gelling agent;
    5 wt % to 25 wt % of a hydrophobic second liquid;
    15 wt % to 40 wt % of a wax;
    1 wt % to 45 wt % of a plasticizer;
    0.01 wt % to 4 wt % of an emulsifier; and
    optionally 0.01 wt % to 15 wt % of one or more additives,
    wherein said emulsion-colloid system is a flowable emulsion above 60° C. and less than the boiling point of said hydrophilic first liquid, wherein said emulsion-colloid system is a colloid below 40° C., wherein said emulsion-colloid system is capable of reversible transition, mediated by temperature, between said flowable emulsion and said colloid, wherein said emulsion-colloid system is in the form of a colloidal barrier material disposed on a substrate, and wherein said substrate is selected from the group consisting of grain, soil, silage, plants, plant roots, and lignocellulosic biomass.

10. The emulsion-colloid system of claim 9, wherein said hydrophilic first liquid is water, and wherein said water is selected from the group consisting of well water, purified water, reverse osmosis water, process water, municipal water, soft water, hard water, tap water, and combinations thereof.

11. The emulsion-colloid system of claim 9, wherein said acid is selected from the group consisting of mineral acids, organic acids, carboxylic acids, and combinations thereof.

12. The emulsion-colloid system of claim 9, wherein said gelling agent is selected from the group consisting of agar, agarose, alginate, gelatin, carrageenan, carboxymethyl cellulose, guar gum, sodium pectate, gum tragacanth, and combinations thereof.

13. The emulsion-colloid system of claim 9, wherein said hydrophobic second liquid is selected from the group consisting of petroleum-based oil, plant-based oil, animal based-oil, and combinations thereof.

14. The emulsion-colloid system of claim 9, wherein said wax is selected from the group consisting of plant-derived wax, animal-derived wax, petroleum-derived wax, and combinations thereof.

15. The emulsion-colloid system of claim 9, wherein said plasticizer comprises glycerin derived from a petroleum source, a plant source, an animal source, or combinations thereof.

16. The emulsion-colloid system of claim 9, wherein said additives are selected from the group consisting of cross-linking agents, photoreactive polymers, gas-impermeability agents, UV-absorption agents, light-scattering agents, catalyst deactivators, chemical-absorption agents, fertilizers, herbicides, pesticides, insecticides, fungicides, stabilizers, fire retardants, and combinations thereof.

17. The emulsion-colloid system of claim 9, wherein said colloidal barrier material is a contiguous layer that is physically integral with said substrate.

18. An emulsion-colloid system for forming a colloidal barrier material disposed on a substrate, said emulsion-colloid system comprising:
    5 wt % to 25 wt % water;
    0.01 wt % to 5 wt % citric acid;
    5 wt % to 10 wt % gelatin;
    10 wt % to 45 wt % glycerin;
    0.01 wt % to 5 wt % guar gum;
    0.01 wt % to 5 wt % mustard powder;
    5 wt % to 25 wt % soybean oil;
    15 wt % to 40 wt % stearine;
    0.01 wt % to 2 wt % titanium dioxide; and
    0.01 wt % to 5 wt % colorant, dye, pigment, or other coloring agent,
    wherein said emulsion-colloid system is characterized by a first instance that is a flowable emulsion above 60° C. and less than 100° C., wherein said emulsion-colloid system is characterized by a second instance that is a colloid below 40° C., and wherein said emulsion-colloid system is capable of reversible transition, mediated by temperature, between said first instance and said second instance.

* * * * *